United States Patent
Williams et al.

(10) Patent No.: US 7,447,380 B2
(45) Date of Patent: Nov. 4, 2008

(54) EFFICIENT METHOD FOR CREATING A VIEWPOINT FROM PLURALITY OF IMAGES

(75) Inventors: Thomas D. Williams, Shutesbury, MA (US); Nitin M. Vaidya, Shrewsbury, MA (US)

(73) Assignee: INOE Technologies, LLC, Northampton, MA (US)

( * ) Notice: Subject to any disclaimer, the term of this patent is extended or adjusted under 35 U.S.C. 154(b) by 660 days.

(21) Appl. No.: 10/660,751

(22) Filed: Sep. 12, 2003

(65) Prior Publication Data
US 2004/0096119 A1    May 20, 2004

Related U.S. Application Data

(60) Provisional application No. 60/410,336, filed on Sep. 12, 2002.

(51) Int. Cl.
*G06K 9/62* (2006.01)
(52) U.S. Cl. .................................. 382/284; 382/215
(58) Field of Classification Search ................ 382/284, 382/143, 100, 215, 154, 103, 162, 107, 294; 348/412.1, 14.16, 14.15, 19, 20, 143, 36; 345/716; 701/225
See application file for complete search history.

(56) References Cited

U.S. PATENT DOCUMENTS

| | | | | |
|---|---|---|---|---|
| 4,635,203 | A * | 1/1987 | Merchant | 701/225 |
| 5,067,014 | A * | 11/1991 | Bergen et al. | 382/107 |
| 5,150,209 | A * | 9/1992 | Baker et al. | 375/240.02 |
| 5,251,271 | A * | 10/1993 | Fling | 382/162 |
| 5,598,515 | A | 1/1997 | Shashua | |
| 5,684,935 | A * | 11/1997 | Demesa et al. | 345/419 |
| 5,729,471 | A | 3/1998 | Jain et al. | |
| 5,850,352 | A | 12/1998 | Moezzi et al. | |
| 6,006,257 | A | 12/1999 | Slezak | |
| 6,084,979 | A | 7/2000 | Kanade et al. | |
| 6,185,314 | B1 * | 2/2001 | Crabtree et al. | 382/103 |
| 6,198,852 | B1 | 3/2001 | Anandan et al. | |
| 6,201,541 | B1 | 3/2001 | Shalom et al. | |
| 6,219,444 | B1 | 4/2001 | Shashua et al. | |
| 6,353,678 | B1 * | 3/2002 | Guo et al. | 382/154 |
| 6,587,601 | B1 * | 7/2003 | Hsu et al. | 382/294 |
| 6,646,655 | B1 * | 11/2003 | Brandt et al. | 715/723 |
| 6,924,832 | B1 * | 8/2005 | Shiffer et al. | 348/36 |
| 7,277,118 | B2 * | 10/2007 | Foote | 348/36 |

(Continued)

OTHER PUBLICATIONS

Title: Human Tracking in multiple cameras Authors: Kahn,s. Javed, O. Rasheed, Z. and Shah, M. Publication: Computer Vision, 2001. Proceedings.Eighth IEEE International Conference on Publication Date: Jul. 7-14, 2001., vol. 1 And INSPEC Accession No. 7024192.*

(Continued)

*Primary Examiner*—Jayesh A. Patel
(74) *Attorney, Agent, or Firm*—Dickstein Shapiro LLP (57) ABSTRACT

A method for creating a novel viewpoint image from a plurality of images includes the steps of simultaneously and continuously acquiring sets of images from a plurality of cameras. Predetermined background based correspondence fields are used to detect novel objects. Image representations are assigned for these objects likely new correspondences. These likely new correspondences are tested and further improved upon in a refinement step. The resulting correspondences are used to construct a novel viewpoint image.

16 Claims, 7 Drawing Sheets

U.S. PATENT DOCUMENTS

2002/0154695 A1* 10/2002 Cornog et al. ......... 375/240.16
2003/0035592 A1* 2/2003 Cornog et al. ............... 382/284
2004/0169676 A1* 9/2004 Williams et al. ............ 345/716

OTHER PUBLICATIONS

Shashua, A. et al., "Trilinearity of Perspective Views and its Associated Tensor," Institute of Computer Science, Jun. 1995, Hebrew University of Jerusalem.

Avidan, S. et al, "Novel View Synthesis by Cascading Trilinear Tensors," IEEE Transactions on Visualization and Computer Graphics, vol. 4, No. 4, pp. 293-306, Oct.-Dec., 1998.

Faugeras, O. et al, "What can two images tell us about a third?", Inria, Programme 4—Robotique, image et vision, Projet Robotvis, pp. 1-23, Jul. 1993, Sophia Antipolis, France.

Barrett, E.B. et al., "Some Invariant Linear Methods in Photogrammetry and Model-Matching," IEEE, O-8186-2855, pp. 122-128, Mar. 1992.

* cited by examiner

Figure 4 Difference

Figure 5 Body Field Generation

Figure 6 Refinement

Figure 7 Warp Field Generation

EFFICIENT METHOD FOR CREATING A VIEWPOINT FROM PLURALITY OF IMAGES

This nonprovisional application claims the benefit of U.S. Provisional Application No. 60/410,336, filed Sep. 12, 2002.

FIELD OF INVENTION

The present invention relates to the field of imagery in multimedia, video (including interactive, immersive, Internet and networked streaming video), virtual reality, telepresence and television. More particularly, the present invention relates to a method by which an image from an uncaptured viewpoint, caused by a change in observation position that provides a new line of sight, is efficiently created from a plurality of captured images.

BACKGROUND OF INVENTION

In the field of imagery and image creation, the most time-consuming and error-prone aspects of algorithms used for generation of novel viewpoints from a plurality of images, is the correspondence process; namely, finding correct correspondences between the features of two or more images. Correspondences between features of two or more images are usually found by an automated technique that compares (or "matches") areas of one image with areas of another image. It is very expensive for a correspondence process to compute a complete match of every feature in the image.

Most conventional techniques use per-pixel search in the image matching step of determining correspondences. Some selective techniques are often employed in order to reduce the amount of processing required in the image-matching step. Moreover, per-pixel search based matching ("PPSBM") even with selective processing, causes video processing systems to perform poorly, both with respect to quality and time consumption, making real-time provision of virtual viewpoints very costly.

The selective techniques that limit processing time for PPSBM often employ temporal change detection. However, such change detection techniques detect changes in many areas that are part of the background. For example, the shadows of moving foreground objects that are usually projected onto background objects are detected. As a result, these photogrametric changes give rise to significantly more processing than is necessary. Furthermore, interior points of objects are not detected using conventional techniques, leading to errors in matching that subsequently lead to errors in the correspondences. Furthermore, PPSBM tends to give sparse results (few correspondences with respect to the number of pixels in the image), whereas dense results (up to the number of pixels in the image) are needed. Furthermore, PPSBM can give noisy results inside objects where contrast is low or features are lacking.

Thus, there is a need for a correspondence-finding method that creates dense correspondence fields, is less time consuming, and reduces processing errors without impairing match quality.

SUMMARY OF INVENTION

The present invention satisfies, to a great extent, the foregoing and other needs not currently satisfied by existing techniques. This result is achieved, in an exemplary embodiment, by a method wherein multi-image correspondence of a scene's background, which is free of movable objects is determined in advance, a multiple of foreground objects is detected, and correspondence fields for those detected objects are found and joined with the background correspondences, all in real time.

More specifically, in a preferred embodiment, two or more images are obtained simultaneously from one or more pairs of cameras, each camera of which is located in differently, but with significantly overlapping views of a scene. The cameras are stationary and, in advance of processing, one or more pair of images are obtained. For each image pair, a background scene free of movable object(s) is imaged. For each background scene image pair, an original set of correspondences is determined. This set is called the "background correspondence field" for the said camera pair. The background correspondence field is used thereafter in real-time to detect movable objects that are not in the previously determined background scene, and is also used in later real-time steps.

Each detection of a movable object is spatially grouped and assigned a distance value based on its position relative to the background scene. These distance values are used to create new correspondences, which are incorporated into the original of background correspondence field. In an iterative manner, the new correspondences are further refined. This refinement consists of one or more steps of determining the quality of the new correspondences and adjusting the object parameters to improve that quality.

When a measure of satisfaction of accuracy (ability of correspondences to match the image pair) is obtained, or other requirements such as the lapse of time. The resulting correspondence field(s) become final, and along with the geometric relationship of the cameras are used to generate a warping field. Said warping field is then applied to one or more of the real-time images captured from an actual fixed camera. In this regard, the result of applying the warping field is to generate an uncaptured viewpoint image.

The above-mentioned method of the present invention dramatically simplifies conventional correspondence matching from a per-pixel based search operation to a warping and an image differencing operation that is easily performed on existing digital video processing devices or the like, for example, and in real time. Real-time processing is an important advantage, since a primary purpose for determining image correspondence data is its use in generating virtual reality imagery, or a visual telepresence experience by users who are viewing an actual scene in real-time.

The method of the present invention provides a high degree of satisfaction in correspondence results, such that any matching errors result in visually pleasing images that are adequate for a number of useful applications. This is because the correspondences always agree with those that a realistic three-dimensional scene object would project.

Furthermore, the method of the present invention produces a dense correspondence field without additional processing steps.

With these and other advantages and features of the invention that may become hereinafter apparent, the nature of the invention may be more clearly understood by reference to the following detailed description of the invention, the appended claims and to the several drawings attached herein.

Nomenclature

The following terms, in alphabetical order, is presented for easier understanding of the detailed description, as to the field of imagery.

Background Correspondence Field

A Correspondence Field that is generated on the basis of images of a scene where there are no movable objects present.

Correspondence

The spatial relationship between a feature in one image and the same feature in another image.

Correspondence Field

A group of all the correspondences for two images.

Dense Correspondence Field

A Correspondence Field that has nearly as many, or just as many elements as there are pixels in one of the images.

Differenced

A Differenced Image is the result of applying the difference operation to two images, or "differencing" them.

Differencing

The process of subtracting one image (or portion of an image) from another.

Disocclusions

Areas in a novel viewpoint image that are not viewed by the camera from which the image is warped to produce said novel viewpoint image. These areas are occluded from view in the existing camera, but are not occluded from the novel viewpoint.

Image (A Digital Image)

A regular array of point values, usually representing brightness and color values as samples of a picture. Sometimes an image is an array of values, still registered with the image frame, but representing quantities other than brightness or color, such as correspondence or image difference.

Pixel

An element of a digital image, or Picture Element, usually corresponding to one sample at one spatial location.

Per-Pixel Search Based Matching

A process for finding correspondences between images that selects pixels in one image and searches for the best match in the second image. A selection process may cause the search to avoid some or many pixels.

Novel Viewpoint

A viewpoint that is different from that available from an actual camera.

Novel Viewpoint Image

An image generated to appear as one would if it were created at a novel viewpoint.

Real-Time

An adjective that qualifies computer or device processes that operate at such a rate that they continuously accept inputs and produce outputs, and the delivery of those outputs has constant and reasonably small delay from those inputs. This is in contrast to off-line processes which may gather inputs and then process those inputs for some long period. A real-time process "keeps up" with the inputs.

Scene

The visual world, usually limited as can be viewed from some viewpoint or in some area.

Synthetic Camera Position (Also a Novel Viewpoint)

A camera position that is not the position of an actual camera. Also called a "novel viewpoint".

View

Noun: same as Viewpoint, Verb: to see or create an image.

Viewpoint

A position, describable with 6 parameters (three translational and three rotational) where a camera or eye would be in order to view a scene.

Viewpoint Image

An image captured from a viewpoint, or one that appears to be captured from a viewpoint.

Warp Field

A regular array of two-dimensional vectors that describe the way that one image is to be distorted, on a pixel-by-pixel basis, to create a second image.

Warped Image

The result of warping an image by the application of a warp field through the process of warping.

Warping

The process of applying a warp field to distort one image and produce another. Generally, each vector of the field is used to acquire image values from one image and deposit them into another. The Warping process is the collective application of the entire field of vectors.

BRIEF DESCRIPTION OF PREFERRED EMBODIMENTS

DETAILED DESCRIPTION OF PREFERRED EMBODIMENTS

The present invention is directed to an efficient method for generating an uncaptured viewpoint derived from a plurality of captured images. The method ignores photogrametric changes in an image in favor of true three-dimensional changes in the scene. In this regard, the present invention is more efficient than conventional techniques, such as per-pixel search-based matching, in that direct detection and heuristically implied correspondences provide nearly correct results. These results are usually very adequate data for subsequent viewpoint generation steps. When they are in error, the results will still produce adequate visual displays for many applications such as (but not limited to) real-time virtual telepresence in indoor and outdoor scenes for entertainment, tourism, and security.

Figure 1:
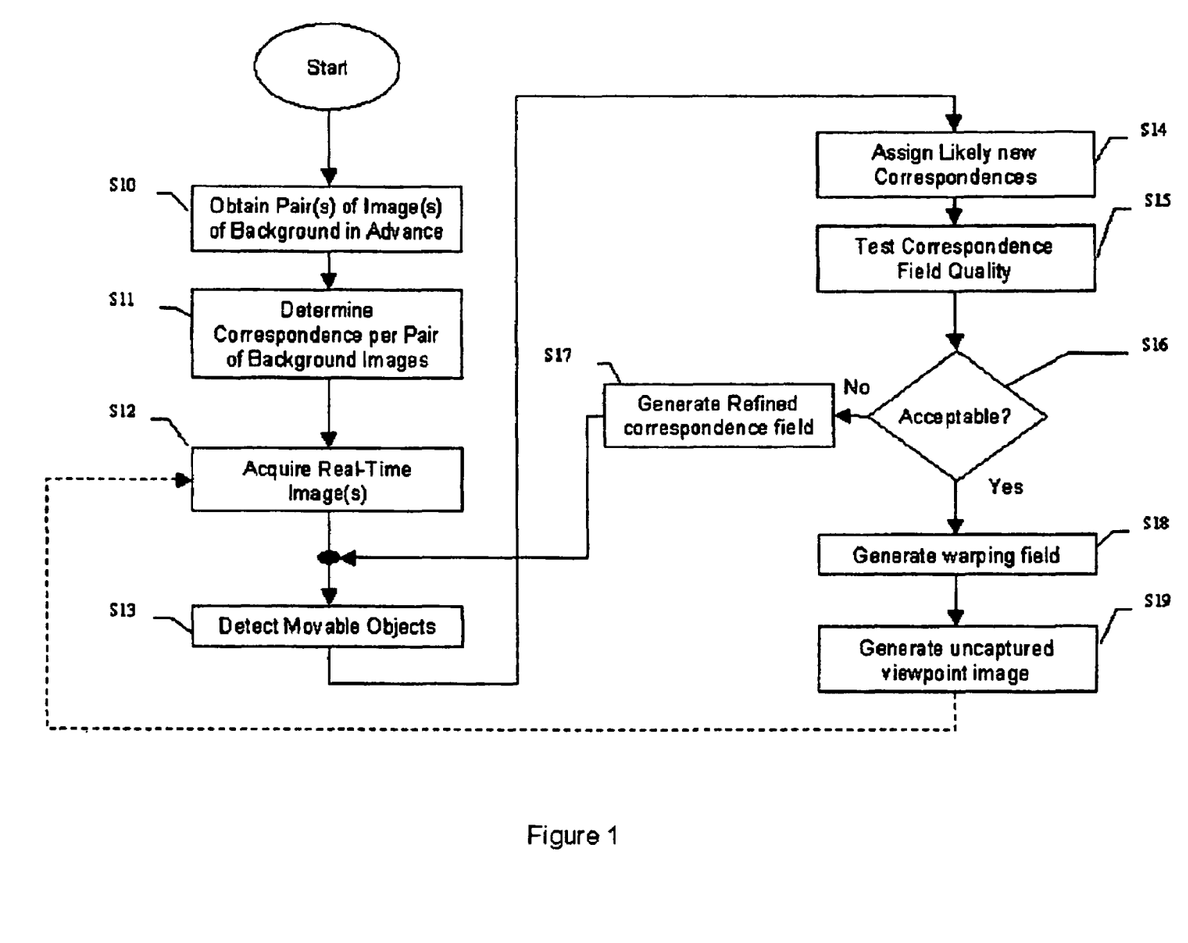
FIG. 1 is a flow chart describing a method for efficiently creating an uncaptured viewpoint from a plurality of images, in accordance with a preferred embodiment of the present invention.

Referring now to the figures, wherein like reference numerals indicate like elements or steps, in FIG. 1 there is shown a flow chart of the method of the present invention.

In advance, for each camera pair, a background scene, preferably free of movable object(s), is imaged (S10). Each such pairs of images are obtained, simultaneously, from one or more pairs of cameras, each camera of a pair located differently, but with significantly overlapping views of a scene. The cameras are preferably stationary in their respective locations.

A dense correspondence field of the background scene is also determined in advance for each pair (S11). If more than one pair shares a camera, dense correspondence fields are determined for all such pairs.

Subsequently, in real-time, image are acquired as at S12. Also, in real-time, the original set of correspondence data for the background is used to detect movable objects that are not in the background scene previously determined, as at S12. This is accomplished by using the correspondence data as a warp field, warping one image so as to come into correspondence with the other image, and differencing the other said image and the warped one. A threshold is applied to the resulting difference values resulting in a binary image where all pixels above the threshold are detections. These detections are spatially grouped. All of these detection steps occur within the step S13.

Each spatially grouped detection is assigned a distance value based on the group's position relative to the background scene. The distance value of each group is used in turn to create new correspondence data, which are integrated into the original set of correspondences as in S14.

The resulting correspondence data are again refined and used as a warp field. Again, images are differenced and detections indicate remaining errors in estimating correspondences as in S15.

The refinement of the correspondence field can repeat (iterate) until either a sufficiently small residual error is achieved, or a specified amount of time has elapsed as in S16 and S17.

The final correspondence field is thus used (along with other information) in the formation of a warping field (S18), which in turn is used to warp an existing real image or images to generate an uncaptured viewpoint image (S19). At least one image is warped to generate the uncaptured viewpoint image.

In a continually operating system, the correspondence field for the next time instant may either be the updated and refined correspondence field from the previous time instant, or the original background correspondence field (as is shown in FIG. 1 by the dashed line).

Figure 2:
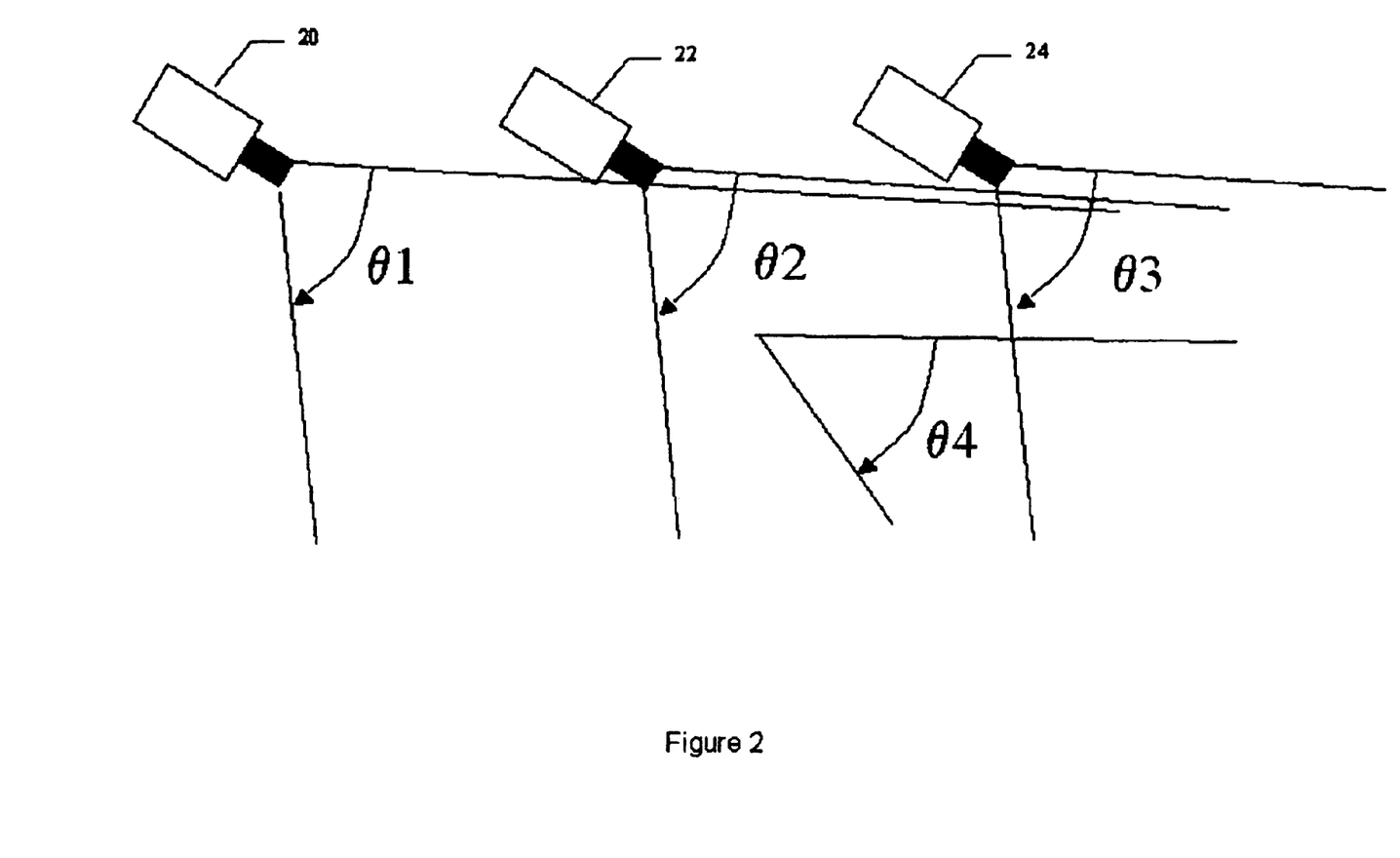
FIG. 2 is a block diagram of exemplary devices useful to generate an uncaptured viewpoint image, in accordance with FIG. 1.
Figure 3:
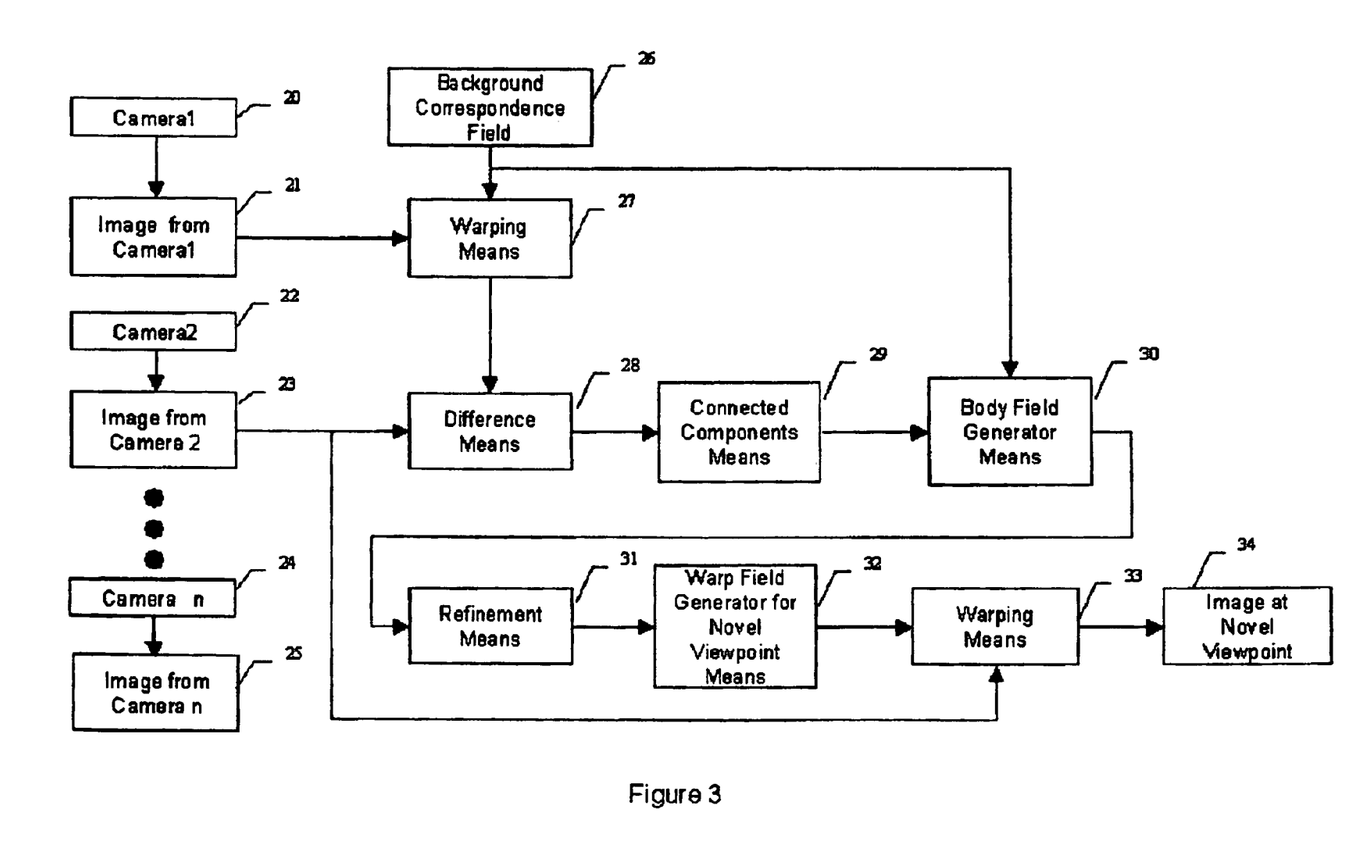
FIG. 3 is a diagram showing a preferred orientation of one or more cameras employed in the present invention.

Referring now to FIG. 2 and FIG. 3, there is shown a block diagram of exemplary devices, which is useful to generate an uncaptured viewpoint image, in accordance with a preferred embodiment of the present invention. For example, a plurality of electronic imaging devices, such as video or digital cameras 20, 22 and 24 (hereinafter referred to as "cameras"), is positioned so that a moving or stationary scene is captured as in FIG. 2. One or more images of the scene is of appropriate resolution and view for a desired application. Preferably, each camera 20, 22 and 24 provides a continuous stream of images, as in a video signal.

Although there is no specific requirement to orient the cameras 20, 22 and 24 in a precise manner, there is a minimum requirement that the cameras 20, 22 and 24 are oriented such that camera view angles are substantially similar and provide desired viewing coverage, as in FIG. 2.

It is also possible for the camera arrangement to be less carefully placed or randomly placed, where sufficient quantity of overlapping views with sufficient parallax exists to produce short sequences that are joined to form useful visual reality paths. Random or nearly random placements of the cameras 20, 22 and 24 may be necessary for military or law enforcement applications, or where rapid placement, stealth or covert camera placement is necessary.

In one embodiment, it is most advantageous to orient the cameras 20, 22 and 24 so that at least views from adjacent cameras overlap each other. In this respect, the cameras 20, 22 and 24 depicted in FIG. 2 are oriented so that at least pairs of cameras (e.g. cameras 20, 22 or cameras 22, 24) have similar views, per angles $\theta_1, \theta_2, \theta_3$, into a scene and provide parallax information sufficient to produce relative image displacements sufficient for subsequent image and/or correspondence processing.

The above-mentioned example is provided to assist in the understanding of the present invention and is not meant to impose limitations on the range of applications or usefulness of the invention. In particular, some large number of cameras, without limit may be part of some application that utilizes the teaching of the present invention.

Referring to FIG. 3, it can be seen that imaging data 21 collected by the cameras 20 are communicated to a first warping device 27, which is capable of warping a digital image. Warping may be performed very quickly, and in less the time required to acquire a video image, so that a single device while maintaining an acceptable frame rate, for instance, may process all the image's color channels.

In operation, as shown in FIG. 3, one (or more) image 21, from camera 20, is transmitted to a warping device 27. A background correspondence field 26 is inputted into the warping device 27 and applied to the image 21, to warp the image 21. This background correspondence field is the field that contains correspondences between the respective camera 20 for that image 21 and the another camera 23.

Figure 4:
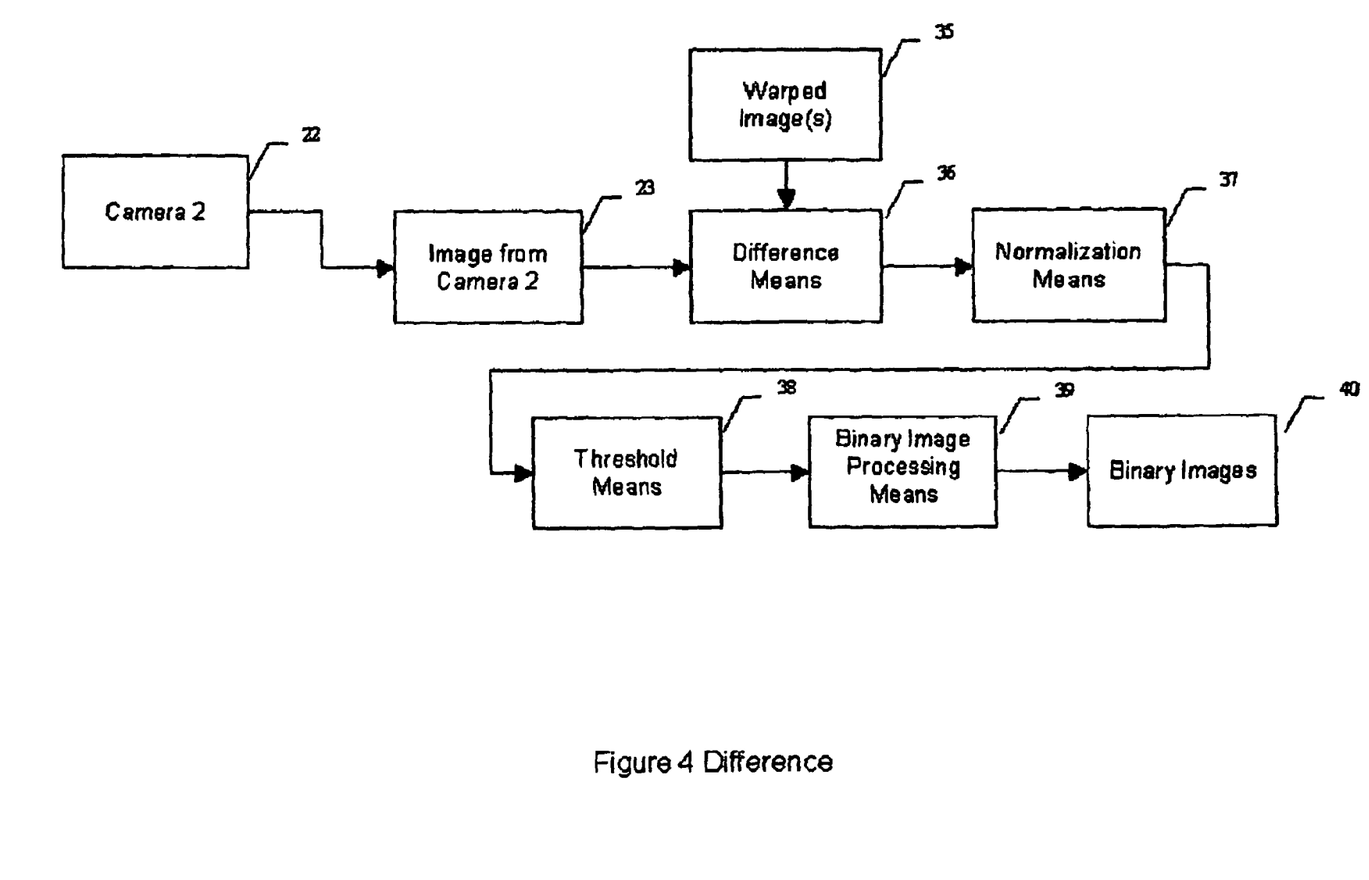
FIG. 4 is a flow diagram showing a process for differencing a warped image and a captured image.

The warping device 27 generally creates and outputs a single warped image 35 for each input correspondence field and image (see FIG. 4). Each resulting warped image 35 will be in registration with the actual image 23 from camera 22. Places where there are differences between the warped image and the actual image 23 from camera 22 will be places were movable (non-background) objects exist in the scene. In instances where more than one image is used, additional images 25, etc are also warped by additional background correspondence fields to bring them also into correspondence with said other one image 23.

Difference Means

As shown in FIG. 4, a difference means is a set of steps that compare a warped image 35 with an image 23 to produce an image for each warped image 35 wherein larger numeric values are set that represent image locations where novel objects are more likely to exist than not. This difference means 36 is followed by some normalization means 37. An example may be as simple as a subtraction (difference means 36) followed by an absolute value operation (normalization means 37). It may, however be more complex, such as the determination of geometric difference, or an area based difference. In general, after normalization, all resulting data have similar low numeric values except those for which the correspondence will be poor. If more than one image is warped 35 to be compared with the single image that is not warped 23, than the same difference process is applied to each such pair as well, and so on. A threshold process 38 reduces the result to a binary image representing areas where change occurs relative to the said single non-warped image. Further standard binary image processing 39 is performed to improve the result. This includes morphological operations such as dilation and erosion to fill in small gaps and remove very small, unconnected blobs. The result is a binary image, or a set of binary images 40 in the case of more than one warped image 35 was taken as input.

Connected Components Means

As shown in FIG. 3 a connected components means 29 is applied to the binary image 40 resulting from the previous difference means process. This process, as in classical literature, assigns unique labels to each connected blob; thereby creating identified regions in the image. A label assignment process is applied that is easily implemented in common digital video apparatus. Once completed, each region is not touching another region save the background, which contains a single unique label. The result is a connected components image 41.

Body Field Generator Means

Figure 5:
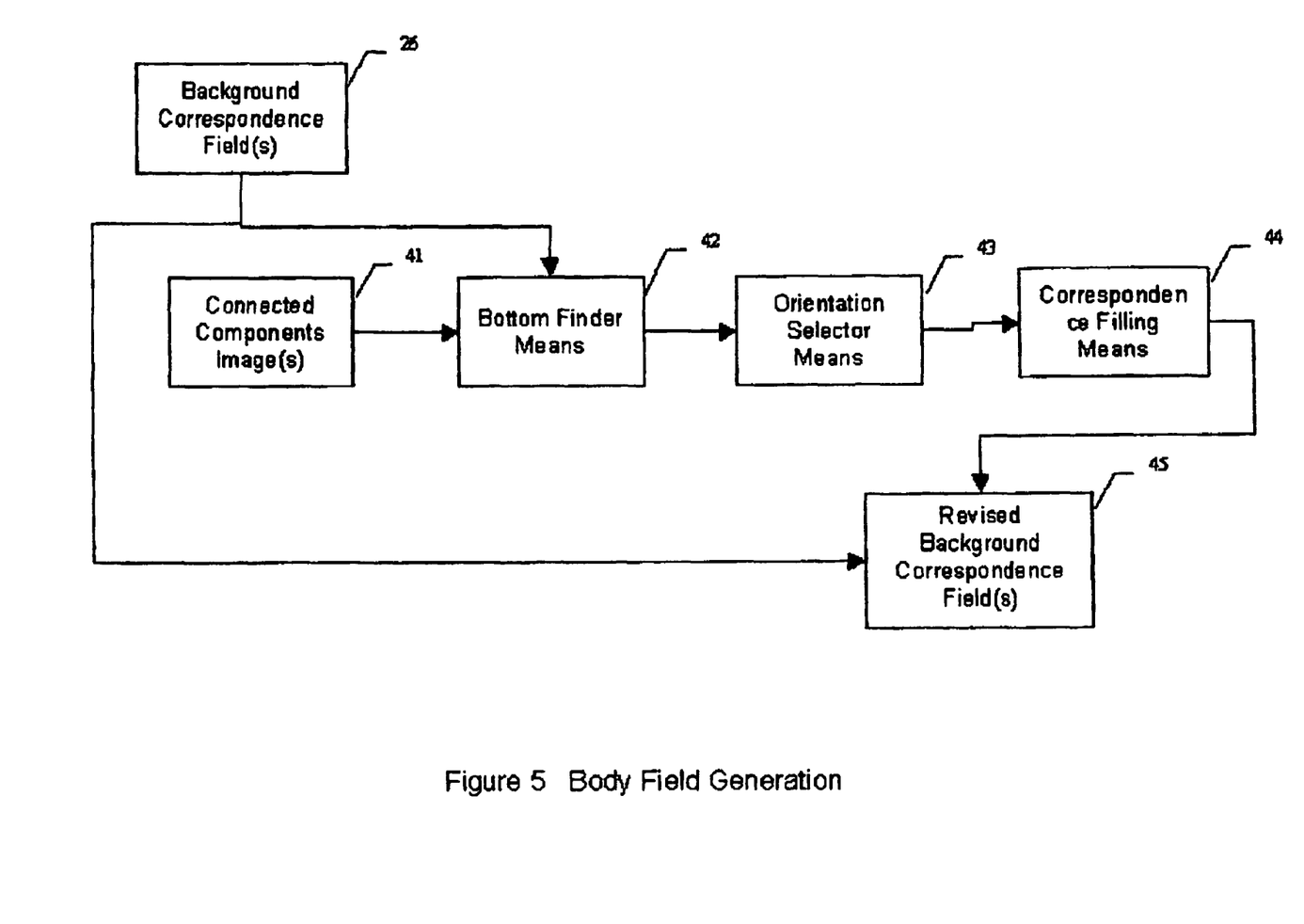
FIG. 5 is a flow diagram showing a process for generation of a correspondence field for a body of connected components.

As shown in FIG. 5 a body field generator means takes the region label image from the connected components means 29, and the set of background correspondence field(s) 26 to develop a field of suggested correspondences for all the non-background regions and adds these to the background correspondence field(s). This (these) revised background correspondence field(s) 45 is then used in subsequent processing.

Various means for accomplishing body field generation are available. In the present embodiment an example is taught. A bottom finder means 42 discovers the lowest point in a non-background region from the connected component image(s) 41. One or more orientations are selected 43 to assign to the particular connected component, and the background correspondence field(s) are filled with appropriate correspondences for the assigned orientation(s) 44. This results in revised background correspondence field(s) 45.

Refinement Means

Figure 6:
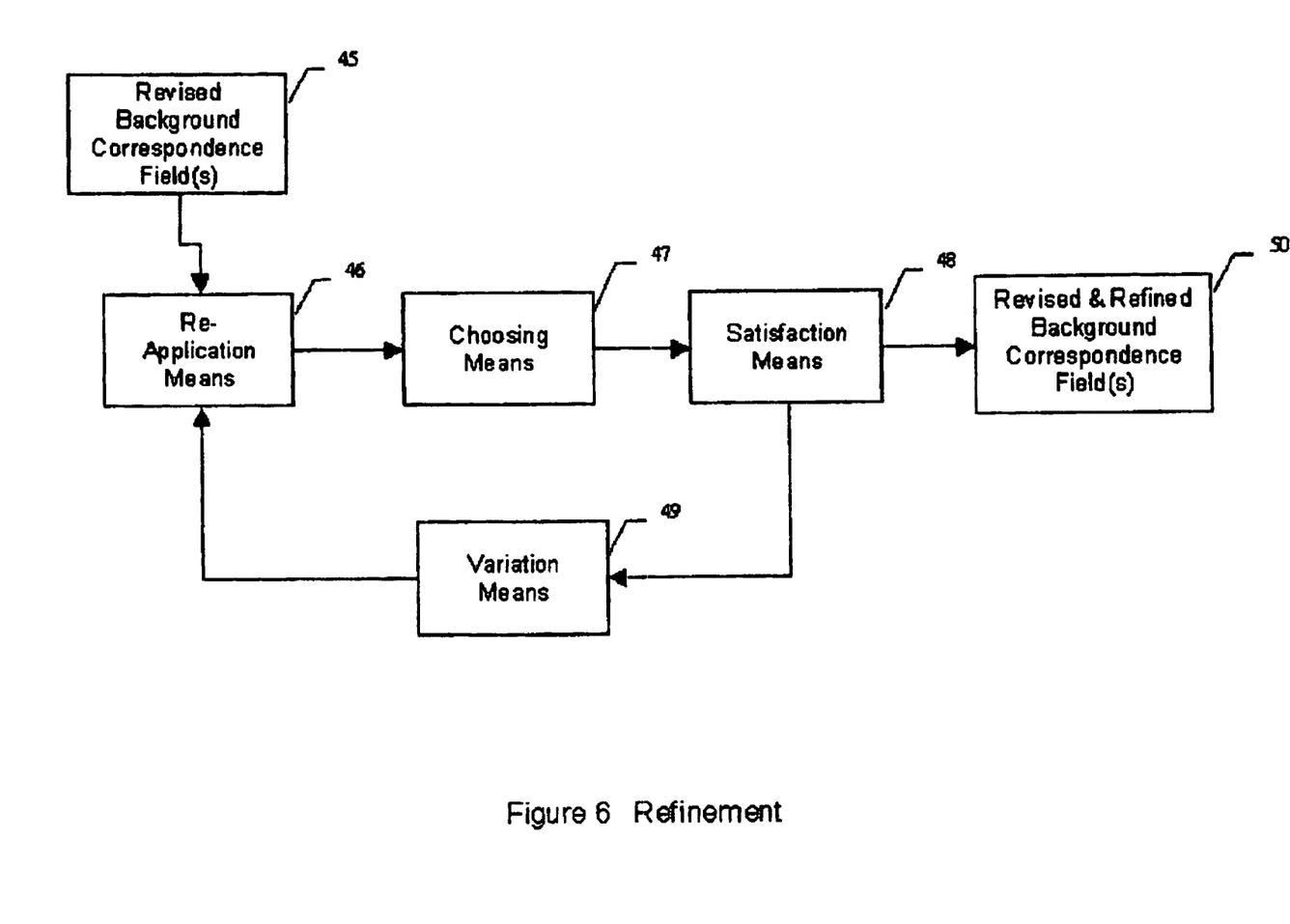
FIG. 6 is a flow diagram showing a process for generation of refined correspondence field(s).

As shown in FIG. 6, a refinement means is a reiteration of some of the previous steps with some modification, not including the image capture step, but again using the same input images. If some error was made in the first iteration of the algorithms to this point, then the connected components means and body field generator means will be applied to resolve two cases for refinement. The first case is error caused by an object having sufficient parallax but not being relatively flat in depth. Such an object will have error that increases in some fashion across the respective region. In such a case, the region must be segmented so that the areas where the error is greatest will be refined. This is done by thresholding, connected components, and the application of a small set of perturbations in distance to the new region body field prior to subsequent warp based differencing.

The second case is where an object has been split and must be re-joined. An example might be a parcel being held by a pedestrian, where the parcel became segmented into its own separate region and was therefore assigned a distance value as though it were touching the background, where in fact, it is not. The correction for this type of error is to join it to the nearby region, apply the correspondence field of the later region to the incorrectly separated one, and apply warp based differencing again.

Refinement proceeds by first re-application 46 of earlier steps, except that the results of the differencing step are accumulated over each connected component and called an "error measure" for that component. A choosing means 47 then orders regions and warp images based on the error. A satisfaction means 48 determines whether the refinement process is done. If it is not, a variation means 49 produces changes in the correspondence fields of the high error regions, and the process is repeated. The result is a revised and refined background correspondence field(s) 50.

Warp Field Generator for Novel Viewpoint Means

Figure 7:
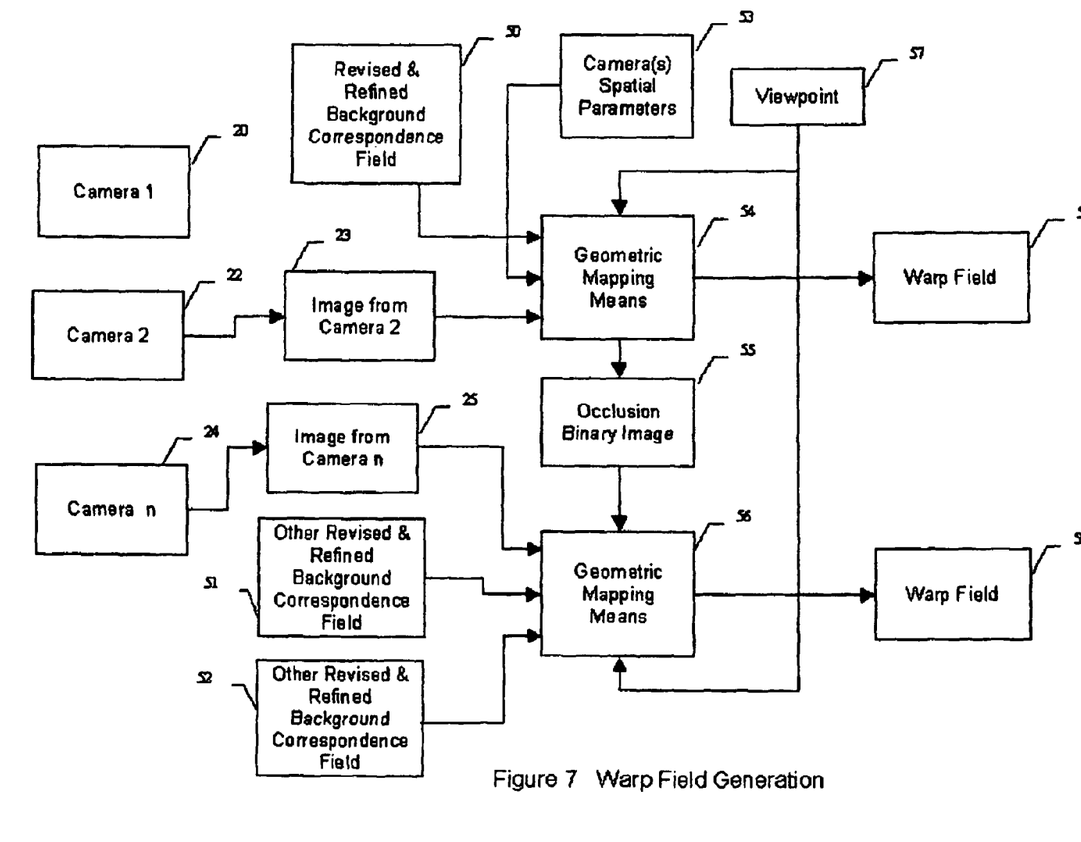
FIG. 7 is a flow diagram showing a process for generation of warp fields which will subsequently be used to warp a captured image to create an novel viewpoint image.

As shown in FIG. 7, a warp field generator for novel viewpoint means takes as input images 22 and 24, revised and refined correspondence fields 50, 51 and 52, camera spatial parameters 53, and a viewpoint 57 and produces warp field(s) 58 (and 59, etc.) to be used in subsequent processing.

A geometric mapping means 54 (and 56, etc) takes camera spatial parameters 53 that express the necessary transform between a camera pair correspondence and a novel correspondence given a viewpoint 57. These parameters are normally expressed in a tri-focal tensor. The geometric mapping means 54 will detect occlusions and disocclusions because there will be areas of the warp field for which there are no warp vectors. These areas are marked as a binary image 55 and passed to a second geometric mapping means 56. This means needs only to process data in those areas, and does so based on an image source known in advance 25 to be likely to be able to resolve such occlusions due to its respective camera's spatial location 24. A series of such processes may be implemented. Each such geometric mapping means produces an individual warp field 58, 59 etc, that may be applied independently in the generation of the final novel viewpoint image.

Performance Tradeoffs and Enhancements to the Invention

The present invention is a method that may be realized with existing computer systems c. 2002 because of its efficiencies and tradeoffs. Although generalized computer systems of this era are powerful, the demanding requirements of the embodiment as taught takes advantage of modern digital video processing systems, such as those constructed by DataCube Corporation. As computer systems become more powerful, these tradeoffs may change so that certain improvements in performance may be appreciated. Factors that are affected by and affect performance are 1) the number of images used for the differencing step, 2) the size (resolution) of images, 3) the frame rate, and 4) the criteria for refinement.

The greatest benefit the present invention enjoys is the performance of real-time processing. This is due to efficiencies of the method taught.

The invention claimed is:

1. A method for efficiently generating a novel viewpoint image of a scene, the method comprising:
   acquiring a pair of background images of the scene;
   generating a dense background correspondence field based on the background images;
   acquiring a pair of real-time images of the scene;
   warping a first image of the real-time image pair into correspondence with a second image of the real-time image pair based on the dense background correspondence field;
   differencing the second real-time image and the warped first real-time image;
   determining that difference values above a threshold correspond to pixels associated with a movable object;
   generating new correspondence data based on a correspondence search between the first and second real-time images, wherein the correspondence search is confined to the pixels associated with the movable object; and
   warping a real-time image based on the new correspondence data to create the novel viewpoint image.

2. The method of claim 1, wherein the generating new correspondence data step further comprises:
   spatially grouping the pixels associated with the movable object;

determining a distance between each spatial group and the background; and generating the new correspondence data based at least in part on the distance.

3. The method of claim 1, further comprising integrating the new correspondence data into the dense background correspondence field.

4. The method of claim 3, further comprising repeating the acquiring, warping, differencing, determining, generating, and integrating steps.

5. The method of claim 4, wherein the repeating continues until a difference between the new correspondence data and the dense background correspondence field is below a threshold.

6. The method of claim 4, wherein the repeating continues until a time limit expires.

7. A system for efficiently generating a novel viewpoint image of a scene, the system comprising:

a plurality of cameras configured to capture at least partially overlapping images of the scene; and a processor configured to:

generate a dense background correspondence field based on background images captured by the cameras;

warp a first subsequent image from a first camera of the plurality of cameras into correspondence with a second subsequent image from a second camera of the plurality of cameras based on the dense background correspondence field, wherein the first and second subsequent images are captured simultaneously;

detect a movable object in the in the warped first subsequent image based on differences above a predetermined threshold in corresponding pixel values of the second and the warped first subsequent images;

generate new correspondence data based on a correspondence search between the second and the warped first subsequent image, wherein the correspondence search is confined to the pixels associated with the movable object; and warp at least one of the subsequent images based at least in part on the new correspondence data to create the novel viewpoint image.

8. The system of claim 7, wherein the cameras are configured to continuously capture images and the processor is configured to continuously generate novel viewpoint images based on the continuously captured images.

9. The system of claim 8, further comprising an output device configured to output a video signal comprising the continuously generated novel viewpoint images.

10. The method of claim 1, wherein a novel object appears in the pair of real-time images but does not appear in the pair of background images.

11. The method of claim 1, wherein the differencing step comprises computing a difference between corresponding digital pixel values in the first and second images of the real-time image pair.

12. The method of claim 1, wherein the dense background correspondence field comprises a plurality of vectors, each vector corresponding to the translation of a pixel in the first image of the pair of background images to a corresponding pixel in the second image of the pair of background images.

13. The method of claim 12, wherein the dense background correspondence field comprises substantially as many vectors as there are pixels in the first image of the pair of background images.

14. The method of claim 13, wherein the dense background correspondence field excludes vectors corresponding to occluded pixels.

15. The system of claim 7, wherein the new correspondence data comprises a plurality of vectors, each vector corresponding to the translation of a pixel in the first subsequent image to a corresponding pixel in the second subsequent image.

16. They system of claim 15, wherein vectors associated with the new object are derived from the correspondence search step and other vectors are derived from the dense background correspondence field.

* * * * *